United States Patent [19]

Bonis

[11] 4,292,355
[45] Sep. 29, 1981

[54] MOISTURE-IMPERVIOUS COEXTRUDED CONTAINER

[75] Inventor: Laszlo J. Bonis, Swampscott, Mass.

[73] Assignee: Composite Container Corporation, Medford, Mass.

[21] Appl. No.: 49,482

[22] Filed: Jun. 18, 1979

[51] Int. Cl.³ .............................................. B65D 11/00
[52] U.S. Cl. ................................... 428/35; 156/244.11; 264/171; 264/176 R; 428/517; 428/519
[58] Field of Search .......................... 428/35, 517, 519; 264/171, 176 R; 156/244.11, 244.13

[56] References Cited

U.S. PATENT DOCUMENTS

| 3,079,037 | 2/1963 | Schechter | 220/266 X |
|---|---|---|---|
| 3,140,004 | 7/1964 | Schaich | 215/1 R |
| 3,394,045 | 7/1968 | Gould | 428/409 X |
| 3,497,877 | 3/1970 | Diemond et al. | 4/172 |
| 3,589,976 | 6/1971 | Erb | 428/515 X |
| 3,769,380 | 10/1973 | Wiley | 264/171 X |
| 3,809,602 | 5/1974 | Monia | 428/35 |
| 3,823,061 | 7/1974 | Frayer et al. | 156/244 X |
| 3,993,810 | 11/1976 | Bonis | 264/171 X |
| 4,101,047 | 7/1978 | Geppert et al. | 264/171 X |
| 4,128,386 | 12/1978 | Wissinger et al. | 264/171 X |

Primary Examiner—Henry F. Epstein

[57] ABSTRACT

A moisture-impervious plastic container thermally formed from a coextruded sheet including a layer of polypropylene directly adhered to a layer of butadiene-styrene polymer.

7 Claims, 3 Drawing Figures

MOISTURE-IMPERVIOUS COEXTRUDED CONTAINER

FIELD OF THE INVENTION

This invention relates to composite plastic containers, particularly to those impervious to moisture.

BACKGROUND OF THE INVENTION

Many food and pharmaceutical products must be packaged in moisture-impervious containers. Historically, glass and metal containers were used for this purpose. More recently, to reduce cost and make the containers disposable, plastics have been combined in multilayer composite structures, with one layer providing the desired barrier to moisture and another layer the required structural properties. An intervening adhesive layer has generally been needed to adhere the other two together. The containers are manufactured by first forming a composite sheet, either by coextrusion or by laminating together separately-formed sheets, and then thermally forming the containers from the sheet.

SUMMARY OF THE INVENTION

I have discovered that polypropylene and butadiene-styrene polymer (sold under the trademark K-Resin by Phillips Petroleum) can be coextruded without an intervening adhesive layer to provide an inexpensive, moisture-impervious sheet that can be thermally formed into a container. The resulting container can be made very transparent for applications such as pharmaceutical blister packs.

In some preferred embodiments, KR03, a particular K resin, is used; the container has only one layer of each material; and one of the layers is colored.

In other preferred embodiments, three layers are provided: two outside layers of one of the materials sandwiching a middle layer of the other. This structure is suitable for vacuum forming.

PREFERRED EMBODIMENTS

I turn now to description of preferred embodiments of the invention, after first briefly describing the drawings.

Turning to the Figures, there is shown a bowl-shaped container 10 having a flattened rim 12 for receiving a lid. The wall of the container consists of two layers: an inner layer of polypropylene 14 and an outer layer 16 of KR03 resin (a butadiene-styrene polymer manufactured by Phillips Petroleum). The total thickness of the wall is about 33 mils.

The container is formed from a coextruded sheet which is produced by the process disclosed in the copending application Ser. No. 67,684 of Laszlo J. Bonis entitled Retortable Container filed on Aug. 20, 1979 and now abandoned. The flat sheet is about 43 mils thick before thermoforming; 10 mils of KR03 resin and 33 mils of polypropylene. The polypropylene is colored to make the container opaque, and is sufficiently thick to provide a moisture barrier. The KR03 butadiene-styrene polymer has high impact resistance and has structural properties which allow the two-layer sheet to be thermoformed. Polypropylene alone cannot be readily thermoformed.

The moisture transmission rate of the two layer preferred embodiment is about 0.03 gms/100 in 2/24 hours.

Figure 1:
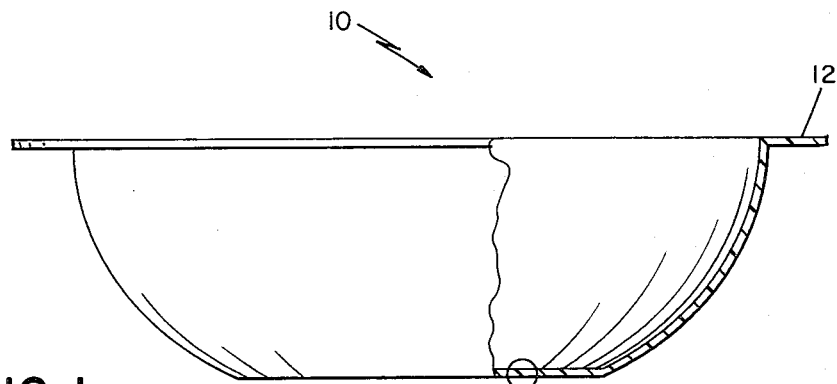
FIG. 1 is a partially cross-sectional view of a preferred embodiment.
Figure 2:
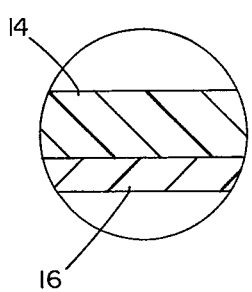
FIG. 2 is an enlarged view of a portion of FIG. 1, showing the two layers forming the wall.
Figure 3:
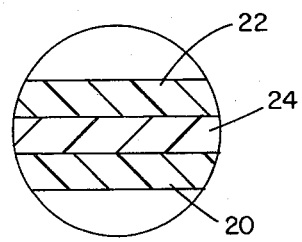
FIG. 3 is an enlarged view of another preferred embodiment having three layers.

Other embodiments are within the following claims. For example, other K resins (e.g., KR01 and KR02, which differ in impact strength from KR03) could be used, as could butadiene-styrene polymers having similar properties to K resin; a mixture of K resin and another styrenic or formable material could be used; the polypropylene and K resin could remain clear to provide a transparent container; and a balanced structure suitable for vacuum forming could be provided by sandwiching one of the two materials between two layers of the other material, as shown in FIG. 3, wherein layers 20, 22 of polypropylene surround a middle layer 24 of K resin.

What is claimed is:

1. A moisture impervious plastic container, with a wall comprising
    a layer of polypropylene and
    a layer of butadiene-styrene polymer directly adhered by coextrusion, without an intervening layer, to said polypropylene layer,
    neither of said layers containing any adhesive material mixed therewith for the purpose of adhering said layers together,
    adhesion between said layers being provided solely by interaction between said polypropylene and butadiene-styrene polymer,
    said polypropylene layer being sufficiently thick to provide a moisture barrier in said wall, and
    said butadiene-styrene polymer layer being sufficiently thick to permit thermoforming of said container from a sheet comprised of said two layers.

2. A coextruded, moisture-impervious sheet suitable for thermoforming into containers, comprising
    a layer of polypropylene and
    a layer of butadiene-styrene polymer directly adhered by coextrusion, without an intervening layer, to said polypropylene layer,
    neither of said layers containing any adhesive material mixed therewith for the purpose of adhering said layers together,
    adhesion between said layers being provided solely by interaction between said polypropylene and butadiene-styrene polymer,
    said polypropylene layer being sufficiently thick to provide a moisture barrier in said wall, and
    said butadiene-styrene polymer layer being sufficiently thick to permit thermoforming of a container from said sheet.

3. The container of claim 1 wherein one of said layers is colored.

4. The container of claim 1 said polypropylene layer is more than twice the thickness of said butadiene-styrene polymer layer.

5. The structure according to claims 1 or 2 further comprising another layer of butadiene-styrene polymer separated by said layer of polypropylene from said first-mentioned layer of butadiene-styrene polymer 6. The structure according to claims 1 or 2 further comprising another layer of polypropylene separated by said layer of butadiene-styrene polymer from said first-mentioned layer of polypropylene.

7. The structure according to claims 1 or 2 wherein said butadiene-styrene polymer layer comprises 100 percent butadiene-styrene polymer resin.

* * * * *